US012754652B2

(12) United States Patent
Liu et al.

(10) Patent No.: US 12,754,652 B2
(45) Date of Patent: Oct. 6, 2026

(54) METHOD FOR TRIGGERING MENU, DEVICE, STORAGE MEDIUM AND PROGRAM PRODUCT

(71) Applicant: Beijing Zitiao Network Technology Co., Ltd., Beijing (CN)

(72) Inventors: Chin-Wei Liu, Beijing (CN); Shuo Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 135 days.

(21) Appl. No.: 18/794,581

(22) Filed: Aug. 5, 2024

(65) Prior Publication Data

US 2025/0085828 A1 Mar. 13, 2025

(30) Foreign Application Priority Data

Sep. 8, 2023 (CN) .......................... 202311161181.1

(51) Int. Cl.

*G06F 3/04815* (2022.01)
*G06F 3/01* (2006.01)
*G06F 3/0482* (2013.01)

(52) U.S. Cl.

CPC .......... *G06F 3/04815* (2013.01); *G06F 3/013* (2013.01); *G06F 3/014* (2013.01); *G06F 3/017* (2013.01); *G06F 3/0482* (2013.01)

(58) Field of Classification Search

CPC ...... G06F 3/04815; G06F 3/013; G06F 3/014; G06F 3/017; G06F 3/0482; G06F 3/011

See application file for complete search history.

(56) References Cited

U.S. PATENT DOCUMENTS

| | | | | |
|---|---|---|---|---|
| 2006/0267951 | A1* | 11/2006 | Rainisto | G06F 3/04883 345/173 |
| 2014/0218343 | A1* | 8/2014 | Hicks | G06F 3/04883 345/179 |
| 2019/0391662 | A1 | 12/2019 | Yokokawa | |
| 2020/0371673 | A1* | 11/2020 | Faulkner | G06F 3/017 |
| 2021/0096726 | A1 | 4/2021 | Faulkner et al. | |
| 2023/0154134 | A1 | 5/2023 | Oh | |
| 2025/0068297 | A1* | 2/2025 | Selig | G06F 3/017 |

FOREIGN PATENT DOCUMENTS

| | | | |
|---|---|---|---|
| CN | 107272890 | A | 10/2017 |
| CN | 110109547 | A | 8/2019 |
| WO | 2020247450 | A1 | 12/2020 |

OTHER PUBLICATIONS

Extended European Search Report for European Application No. 24191538.8, mailed Jan. 21, 2025, 8 pages.
"Addressing CV by design", pp. 1-1.
"Start Gesture", Feb. 2, 2022, pp. 1-4.

* cited by examiner

*Primary Examiner* — Jitesh Patel

(57) ABSTRACT

Embodiments of the present disclosure provide a method for triggering a menu, a device, a storage medium and a program product, the method includes: in response to a menu-triggering gesture presented by a hand of a user, and a posture of a head relative to the hand of the user that meets a preset triggering condition, detecting a movement trajectory of the hand of the user; in response to the movement trajectory meeting a preset condition, displaying a menu panel to the user.

19 Claims, 6 Drawing Sheets

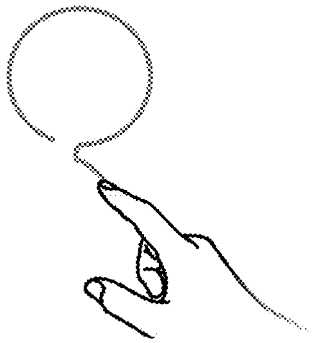

Fig. 9

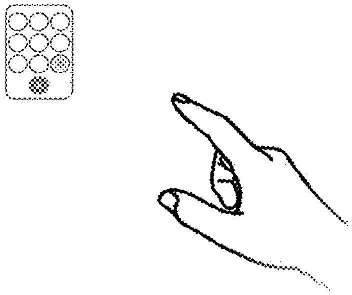

Fig. 10

In response to a menu-triggering gesture presented by a hand of a user, and a posture of a head relative to the hand of the user that meets a preset triggering condition, detect a movement trajectory of the hand of the user In response to the movement trajectory meeting a preset condition, display the menu panel to the user

Fig. 11

In response to the progress of movement meeting a progress condition, display the menu panel of an initial state During the movement, according to the progress of movement, display the menu panel that changes from the initial state to the final state

Fig. 12

METHOD FOR TRIGGERING MENU, DEVICE, STORAGE MEDIUM AND PROGRAM PRODUCT

The present application claims priority to Chinese Patent Application No. 2023111611811, filed on Sep. 8, 2023, the disclosure of which is incorporated herein in its entirety as part of the present application.

TECHNICAL FIELD

The embodiments of the present disclosure relate to the field of computer technologies, and in particular, to a method for triggering a menu, a device, a storage medium and a program product.

BACKGROUND

With the continuous development of computer technologies, wearable display devices such as virtual reality (VR) devices have been increasingly widely used. A wearable display device is typically worn by a user on the head, providing an immersive experience for the user.

In order to improve human-machine interaction capabilities, a wearable display device provides interaction through a peripheral (such as a controller) or freehand interaction, allowing a user to control a display screen, such as triggering a menu display.

At present, in response to a menu being triggered by freehand interaction, problems such as poor triggering accuracy and tending trigger by mistake may lead to poor user experience.

SUMMARY

The embodiments of the present disclosure provide a method for triggering a menu, an apparatus, a device, a storage medium, and a program product to reduce the problem of menu false triggering during freehand interaction.

The first aspect, an embodiment of the present disclosure provides a method for triggering a menu, which includes: in response to a menu-triggering gesture presented by a hand of a user, and a posture of a head relative to the hand of the user that meets a preset triggering condition, detecting a movement trajectory of the hand of the user; in response to the movement trajectory meeting a preset condition, displaying a menu panel to the user.

The second aspect, an embodiment of the present disclosure provides an apparatus for triggering a menu, which includes a detection module configured to, in response to a menu-triggering gesture presented by a hand of a user, and a posture of a head relative to the hand of the user that meets a preset triggering condition, detect a movement trajectory of the hand of the user; and a display module configured to, in response to the movement trajectory meeting a preset condition, display a menu panel to the user.

The third aspect, an embodiment of the present disclosure provides an electronic device, which includes a storage and at least one processor; the storage stores a computed-executed instruction; and the at least one processor executes the computed-executed instruction stored in the storage, so that the at least one processor implements any method for triggering the menu according to the first aspect.

The fourth aspect, an embodiment of the present disclosure provides a computer-readable storage medium, a computer execution instruction is stored in the computer-readable storage medium. The computer-executed instruction, when being executed by a processor, implements any method for triggering the menu according to the first aspect.

The fifth aspect, an embodiment of the present disclosure provides a computer program product, which includes a computer program that, when being executed by a processor, implements any method for triggering the menu according to the first aspect.

BRIEF DESCRIPTION OF DRAWINGS

In order to explain the embodiments of the present disclosure or the technical solutions in the prior art more clearly, the following will briefly introduce the accompanying drawings required for the description of the embodiments or the prior art. Obviously, the accompanying drawings described below are some embodiments of the present disclosure. For those of ordinary skill in the art, other accompanying drawings can also be obtained based on these accompanying drawings without creative efforts.

FIG. 9 is a schematic diagram of a trajectory where a menu panel fails to be normally evoked provided in an embodiment of the present disclosure;

FIG. 10 is a schematic diagram of closing a menu panel provided in an embodiment of the present disclosure;

FIG. 11 is a flow chart of a method for triggering a menu provided in an embodiment of the present disclosure;

FIG. 12 is a flow chart of providing visual feedback provided in an embodiment of the present disclosure;

DETAILED DESCRIPTION

To make the purpose, technical solutions and advantages of the embodiments of the present disclosure clearer, the following will combine the accompanying drawings in the embodiments of the present disclosure to clearly and completely describe the technical solutions in the embodiments of the present disclosure. Obviously, the described embodiments are some embodiments of the present disclosure, but not all of them. Based on the embodiments in the present disclosure, all other embodiments obtained by those of ordinary skill in the art without creative efforts fall within the scope of protection of the present disclosure.

The embodiments of the present disclosure may be applied to any electronic device that can trigger a menu display through freehand interaction, and in particular, to wearable display devices, such as VR devices, Augmented Reality (AR) devices, Mixed Reality (MR) devices, Extended Reality (XR) devices, or the like.

The wearable display device may be a helmet or glasses and the like worn on the head of the user. The wearable display device may be provided with one or more shooting devices capable of shooting an environment view and displaying a corresponding virtual view or a virtual-reality integrated view to a user according to the environment view.

On this basis, the user can control the device through a peripheral or freehand interaction.

In a scenario with a peripheral, the user may move a controller or press a button when using the device, and the device may detect the position and orientation of the controller or the button that is pressed to trigger a corresponding feature, such as screenshotting, screen recording, global navigation (Home), calibration, or the like.

In a scenario of freehand interaction, the user may interact with only one or both hands without using a peripheral to implement relevant features of a peripheral.

Figure 1:
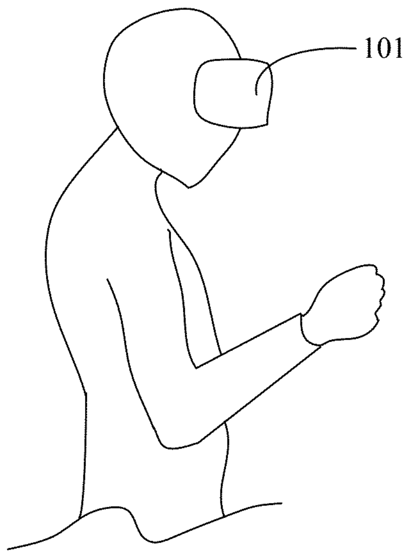
FIG. 1 is a schematic diagram of an application scenario provided in an embodiment of the present disclosure.

FIG. 1 is a schematic diagram of an application scenario provided in an embodiment of the present disclosure. As shown in FIG. 1, in a freehand interaction scenario, when a user wears a wearable display device 101, the wearable display device 101 can shoot the hand of the user and analyze the hand of the user to determine whether a certain function, such as display of a menu panel, is triggered.

In the freehand interaction scenario, because the peripheral is eliminated, how to improve the triggering accuracy and prevent false triggering as much as possible has become a problem that needs to be solved.

In some technologies, in order to improve triggering accuracy, complex gestures may be designed to trigger a menu. For example, the menu can be triggered by making certain gestures with both hands respectively, or by making multiple static gestures one after another with one hand, or by making dynamic changing gestures. However, all of these require users to accurately memorize various gestures, leading to poor user experience.

In other technologies, icons may be used to assist in triggering menus. For example, when a user makes a certain gesture, an icon may be displayed to the user, and when the user looks at the icon and makes another gesture, the menu can be triggered and displayed. This still requires the user to memorize multiple gestures, and icons are required for assistance, making it complex and inefficient, leading to poor user experience.

In view of this, embodiments of the present disclosure provide a method for triggering a menu that conforms to human factors, which can reduce user burden while accurately determining the intention of a user, preventing false triggering as much as possible, and improving triggering accuracy.

Figure 2:
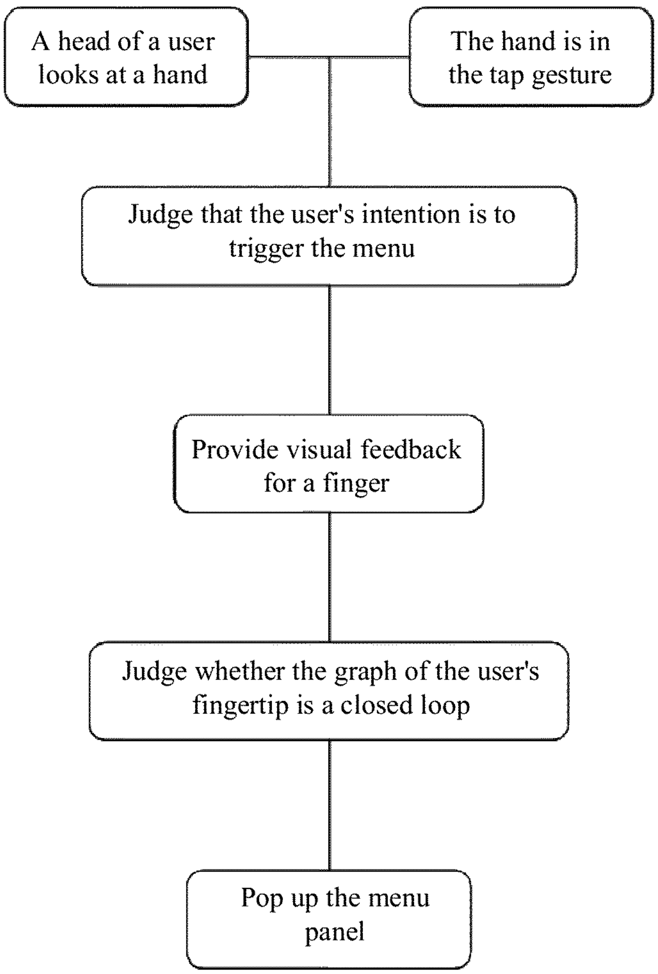
FIG. 2 is a schematic diagram of the principle of a method for triggering a menu provided in an embodiment of the present disclosure.

FIG. 2 is a schematic diagram of the principle of a method for triggering a menu provided in an embodiment of the present disclosure. As shown in FIG. 2, in the embodiment of the present disclosure, the function for triggering a menu may be implemented by the following steps.

For example, as shown in FIG. 2, when a head of a user looks at a hand and the hand is in the tap gesture, it is judged that the user's intention is to trigger the menu; then visual feedback for a finger is provided, and whether to pop up the menu panel is determined by judging whether the graph of the user's fingertip is a closed loop.

Step a: Monitor two types of input data: head data or eye tracking data, as well as hand data, and determine a user intent based on the two types of input data.

Figure 3:
FIG. 3 is a schematic diagram of a tap gesture provided in an embodiment of the present disclosure.
Figure 4A:
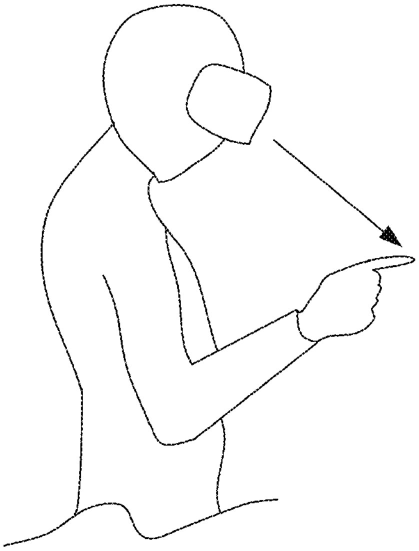
FIG. 4A is a schematic diagram of a scenario where a head of a user looks at a hand of the user provided in an embodiment of the present disclosure.
Figure 4B:
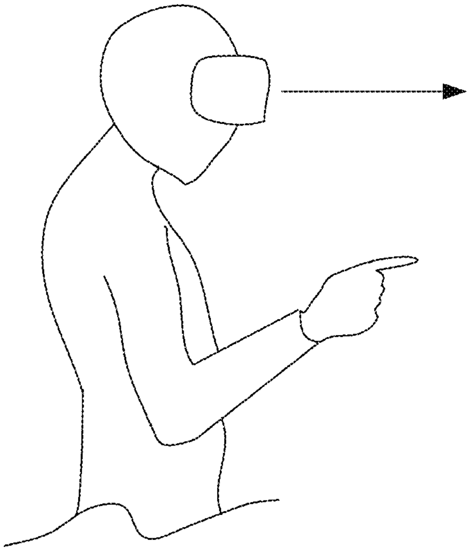
FIG. 4B is a schematic diagram of a scenario where a head of a user does not look at a hand of the user provided in an embodiment of the present disclosure.

Optionally, when it is determined that the user is looking at a hand based on the head data or the eye tracking data, and it is determined that the user is making the tap gesture based on the hand data, the user can be considered to have the intent to trigger a menu. FIG. 3 is a schematic diagram of a tap gesture provided in an embodiment of the present disclosure. FIG. 4A is a schematic diagram of a scenario where a head of a user looks at a hand of the user provided in an embodiment of the present disclosure. FIG. 4B is a schematic diagram of a scenario where a head of a user does not look at a hand of the user provided in an embodiment of the present disclosure. The arrows in the diagram represent the direction of the head orientation or eye gaze of the user.

Step b: When it is determined that the user has the intention to trigger the menu, provide visual feedback at a fingertip, that is, the movement of the fingertip causes a visual trailing.

Figure 5:
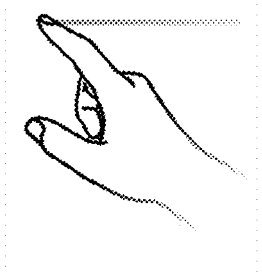
FIG. 5 is a schematic diagram of a fingertip visual feedback provided in the embodiment of the present disclosure.

FIG. 5 is a schematic diagram of a fingertip visual feedback provided in the embodiment of the present disclosure. As shown in FIG. 5, the user can be given visual feedback in the form of fingertip trailing, so that the user may know the current action.

Step c: Calculate a distance between the current position and the initial position of the fingertip, and when the distance decreases, the menu panel changes in size from small to large and changes in the opacity.

Step d: When the fingertip makes a closed loop, the menu panel changes to a normal size with an opacity of 100%.

Figure 6:
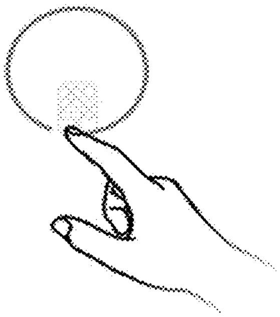
FIG. 6 is a schematic diagram of a menu panel in an intermediate state provided in an embodiment of the present disclosure.
Figure 7:
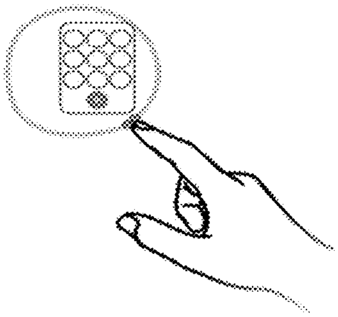
FIG. 7 is a schematic diagram of a menu panel in a final state provided in an embodiment of the present disclosure.

FIG. 6 is a schematic diagram of a menu panel in an intermediate state provided in an embodiment of the present disclosure. FIG. 7 is a schematic diagram of a menu panel in a final state provided in an embodiment of the present disclosure. As shown in FIG. 6 and FIG. 7, when it is determined that the user has the intention of triggering the menu, a visual trailing of the fingertip starting from the initial position is provided. In the process of moving the finger of the user, the fingertip moves away from the initial position, reaches a critical point, and then moves towards the initial position again. Therefore, after passing the critical point, that is, when the distance between the fingertip and the initial position decreases, the menu panel may be displayed, where the menu panel is small with low opacity. As the fingertip approaches the initial position, size and opacity of the menu panel increases. When the fingertip returns to the initial position, that is, the fingertip has closed loop movement trajectory, the menu panel changes to the normal size and opacity. This allows the user to understand the meaning of the action through visual feedback, improving user experience.

Step e: Use the tap gesture to click on the menu panel.

Figure 8:
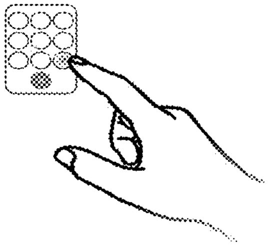
FIG. 8 is a schematic diagram of an action on a menu panel provided in an embodiment of the present disclosure.

FIG. 8 is a schematic diagram of an action on a menu panel provided in an embodiment of the present disclosure. As shown in FIG. 8, one or more functional options in the menu panel may be selected by tapping.

In addition, the embodiments of the present disclosure provide a method for canceling the display of the menu panel.

Step f: When the fingertip is detected as deviated in the process of approaching the initial position, the visual feedback is canceled and evoking of the menu panel is stopped.

Optionally, this step may be performed after step c. FIG. 9 is a schematic diagram of a trajectory where the menu panel fails to be normally evoked provided in an embodiment of the present disclosure. As shown in FIG. 9, the menu panel is displayed normally only after the fingertip movement trajectory is closed, and if there is a deviation in the process of movement, for example, the fingertip moves away from the initial position at a position after passing the critical point, then it is considered that the user does not really want to evoke the menu panel, and the visual feedback may be stopped, that is, the fingertip trailing disappears, and the display of the menu panel is canceled.

Step g: When it is detected that the fingertip is rapidly moving away from the menu panel, it is determined that the user currently intends to close the menu panel.

Optionally, this step may be performed after step e. FIG. 10 is a schematic diagram of closing a menu panel provided in an embodiment of the present disclosure. As shown in FIG. 10, after the menu panel is displayed normally, if the fingertip moves away from the menu panel rapidly, the menu panel can be closed.

In summary, the method for triggering a menu provided in the embodiment of the present disclosure triggers the menu on a condition that the head of the user is looking at the hand and the hand is making a tap gesture, which effectively reduces false triggering, makes the process consistent with the active triggering behavior of the human body, and improves triggering accuracy. It does not need to display an icon first and triggers the menu according to the interaction between the user and the icon, which effectively improves triggering efficiency and stability. In addition, in the whole triggering process, the user only needs to use a single hand type, that is, the tap hand gesture used when finally operating the menu panel, so that the user does not need to memorize complex combination gestures, making the triggering process consistent to the intuition of the user and effectively reducing the user burden. In addition, it can provide visual feedback at the right time to match the triggering progress, so that the users can understand the current action and adjust in real time according to their intentions, further improving the user experience.

Some of the embodiments of the present disclosure are described in detail below with reference to the accompanying drawings. Without conflict between the embodiments, the following embodiments and the features in the embodiments may be combined with each other.

FIG. 11 is a flow chart of a method for triggering a menu provided in an embodiment of the present disclosure. The method may be executed by an electronic device, and particularly, a wearable display device. As shown in FIG. 11, the method for triggering a menu may include:

Step 1101: in response to a menu-triggering gesture presented by a hand of a user, and a posture of a head relative to the hand of the user that meets a preset triggering condition, detecting a movement trajectory of the hand of the user.

Optionally, the menu triggering gesture may be a pre-set gesture, such as a tap gesture where an index finger is extended and the other four fingers are in a holding state. Alternatively, it can be another gesture, such as extending another finger other than the index finger, or extending multiple fingers.

In an actual application, key points of the hand of the user may be detected through images taken by the device, and the current gesture of the user may be determined according to the position of the key points. Alternatively, a hand image of the user may be input into a gesture recognition model to directly determine the current gesture of the user.

In addition to the hand gesture of the user, the head posture of the user may also be detected in this step, where the head may refer to the entire head of the user or to a certain part of the head of the user, such as an eye. The posture may include a position and/or a pose, and the pose may include an inclination angle, such as a pitch angle, and may also be understood as orientation.

The triggering condition may be set according to actual needs. Optionally, the triggering condition is used to indicate that the head is looking at the hand. Correspondingly, the posture of the head relative to the hand meeting a preset requirement may include: the head facing the hand, that is, the line between the head and hand exactly matches the orientation of the head.

Alternatively, the posture of the head relative to the hand meeting a preset requirement may include that the eye is looking at the hand, that is, the position of an eye (and more specifically, the position of a pupil) relative to the position of the hand meets a certain requirement.

A plurality types of sensing devices may be arranged in the wearable display device, such as: a shooting device, an Inertial Measurement Unit (IMU), an eye movement detection device, and the like. Based on the information collected by the sensing device, the specific form of the triggering condition may be set.

In an example, the wearable display device may determine the orientation of the head of the user through the IMU, and determine whether the condition that the head is facing the hand is met according to the orientation of the head of the user.

In another example, the wearable display device may obtain the eye movement data of the user through an eye movement detection device, such as an eye tracker, and the eye movement data may be used to provide information such as the pupil position or gaze direction of the user, and it may be determined whether the user is looking at the hand according to this information.

In another example, the wearable display device can shoot an image or video of the surrounding environment through one or more shooting devices, such as cameras. Because the head of the user and the wearable display device are usually closely fixed, the posture of the shooting device relative to the hand may be used to reflect the posture of the head of the user relative to the hand, and the posture of the shooting device relative to the hand affects the shooting picture, therefore, the posture of the head relative to the hand may also be derived from the shot image. For example, when the head is facing the hand, the hand is usually in the middle of the frame of the image.

In the wearable display device, one or more sensing devices may be provided, and the information collected by the sensing device may be used to directly or indirectly determine whether the posture of the head relative to the hand meets the triggering condition, which is not limited here.

Step 1102: In response to the movement trajectory meeting a preset condition, display the menu panel to the user.

If the hand of the user is detected to render a menu-triggering gesture, and the posture of the head relative to the hand meets the preset triggering condition, the user can be considered to have the intent to trigger the menu. It should be noted that the intent of the user to trigger the menu may be regarded as a starting signal of the triggering, and does not mean that the menu panel must be displayed to the user as soon as the intent is detected. Specifically, after determining that the user has the intention to trigger the menu, it can detect whether the movement trajectory of the hand meets the preset conditions, and if so, the menu panel can be displayed to the user to reduce false triggering.

Optionally, in response to the movement trajectory meeting the preset condition, displaying the menu panel to the user may include: in response to the hand of the user moving under the menu-triggering gesture, and the movement trajectory meets the preset condition, displaying the menu panel to the user.

For example, the menu-triggering gesture is the tap gesture, and when the head of the user looks at the hand and the hand is in the tap gesture, the device determines that the user has the intention to trigger the menu, and the user can further move the hand on the basis of maintaining the tap gesture, and when the movement trajectory meets the preset conditions, the corresponding menu can be displayed to the user.

Optionally, the preset condition may include that the movement trajectory is a closed shape.

In one example, the movement trajectory may be a random closed shape. Optionally, the closed shape may be a regular closed shape, such as a circle, a square, a triangle, or an irregular shape, as long as the hand of the user may return to the initial position thereof to form a closed loop.

In another example, the movement trajectory may be a specific closed shape. For example, the specific closed shape is a circle. When the user draws a circle, a menu panel can be displayed, and when the user draws a square, the menu panel is not displayed. The specific closed shape may be pre-set or may be selected by the user.

In another example, the movement trajectory may be a closed shape, and the dimensions of the closed shape are within a preset size range. The size of the closed shape may be expressed in a variety of forms, such as diameter, side length, perimeter, area, or the like, and the preset size range may be preset. For example, the diameter is greater than the first threshold and smaller than the second threshold, so that display of the menu may only be triggered when the user moves within a reasonable range, preventing false triggering in case of exceedingly high or low user movement.

The scheme detects whether the movement trajectory of the hand is in a closed shape, which is in line with the instinctive action of the user that actually wants to evoke the menu, and the menu-triggering gesture is restricted to be maintained during the limited movement process, which can further increase the constraint of the triggering, but does not increase the number of gestures that the user needs to remember, and can reduce false triggering, improve triggering accuracy, and meet both the efficiency and accuracy requirements without increasing burden of the user.

In other optional implementations, the menu-triggering gesture may also not be restricted during the movement, which can reduce the amount of computation and increase efficiency, or the movement trajectory can also be a shape other than the closed shape, for example, the movement trajectory is in a shape with a checkmark, or the user can set the triggering shape to adapt to the needs of the user.

To sum up, the method for triggering a menu provided in the embodiments of the present disclosure may: in response to a menu triggering hand gesture from a user and a head posture of the user relative to the hand that meets a preset triggering condition, detect a movement trajectory of the hand of the user; in response to the movement trajectory meeting the preset condition, display a menu panel to the user, so that the cooperation of the head and the hand can be used as the trigger condition, which effectively reduces false triggering, improves triggering accuracy, makes the triggering process consistent to the intuition of the user, and eliminates the need to change gestures during the whole process, thereby reducing the burden of the user to remember combined gestures and effectively improving the user experience.

In one or more embodiments of the present disclosure, optionally, visual feedback may also be provided to the user after it is determined that the user has the intent to trigger the menu. The visual feedback can include: visual feedback corresponding to an input, and/or visual feedback corresponding to an output.

Specifically, the visual feedback corresponding to the input can be an input signal from the user, that is, the visual feedback of the hand movement. The visual feedback corresponding to an output may be the visual feedback corresponding to the signal to be expressed to the user. For example, it may be used to indicate to what extent the current operation of evoking the menu panel has proceeded. Both the visual feedback corresponding to an input and the visual feedback corresponding to an output may be used separately or combined together. The following is a detailed explanation of the use of the two together.

Optionally, in response to the movement trajectory meeting the preset condition, displaying the menu panel to the user may include: during the process of the user's hand movement, providing corresponding visual feedback based on the progress of the movement until the preset condition is met, and displaying the menu panel to the user.

The progress of the movement may be determined with reference to the preset condition, and in the process of hand movement, the progress of the movement gradually increases, and when the preset condition is reached, the progress of the movement is 100%. Both the visual feedback corresponding to an input and the visual feedback corresponding to an output may be matched to the current progress of the movement.

In one or more embodiments of the present disclosure, optionally, in response to the movement of the hand of the user, providing corresponding visual feedback based on the progress of the movement includes: in response to the movement of the hand of the user, displaying a trailing or movement trajectory corresponding to a preset part of the hand of the user, and displaying a gradient menu panel based on the progress of the movement until the preset condition is met, displaying the menu panel in the final state.

Optionally, the preset part may be determined by a menu-triggering gesture. It may be one or more parts that can be clearly detected in the menu-triggering gesture, and the part displays a trailing or a movement trajectory that conforms to a subjective habit of the user. For example, in response to the menu-triggering gesture being a tap gesture, the preset part may be the fingertip of the index finger, and the displayed visual feedback effect can make the user feel the effect of writing by the fingertip.

Both the movement trajectory and the trailing that are displayed may allow the user know the current action, but the two are slightly different in that the movement trajectory includes the overall movement trajectory of the hand after determining the intention of the user to trigger the menu, while the trailing may be the movement trajectory in the current period of time. For example, as the hand moves, the previous trajectory may gradually disappear, leaving only the movement trajectory near the current position of the fingertip.

In addition, a gradient menu panel may be displayed, which is equivalent to the visual feedback corresponding to an output. The change of the menu panel can be related to the current progress of the movement, and when the movement trajectory meets the preset condition, the menu panel in the final state is displayed.

In this way, visual feedback matches the current progress of movement may be provided to the user, so that the user can know the current situation, which further improves the user experience. In addition, in the visual feedback provided, the trailing of the fingertip is used to show the user the changes in the actions of the user, which is the visual feedback corresponding to the input of the user. The menu panel is the output object that is ultimately provided to the user, and the gradient menu panel reflects the changes in the output object and is the visual feedback corresponding to the output. Therefore, the above method provides two types of visual feedback corresponding to the input and output respectively, the trailing allows the user to know the movement trajectory of the fingers, and the gradient menu allows the user to see that the menu is currently changing towards the final state of the expectations, and the combination of the two enables the user to have a dynamic and intuitive understanding of the input and output at the same time, thereby improving the user experience.

FIG. 12 is a flow chart of providing visual feedback provided in an embodiment of the present disclosure. As shown in FIG. 12, according to the progress of the movement, displaying the gradient menu panel may include:

Step 1201: in response to the progress of movement meeting a progress condition, displaying the menu panel of an initial state.

The attribute information of the menu panel in the initial state is different from that in the final state. The attribute information includes: size and/or opacity. For example, a menu panel has a size of 10 and an opacity of 100% in the final state and a size of 5 and an opacity of 50% in the initial state.

Optionally, displaying the menu panel of the initial state in response to the progress of movement meeting the progress condition may include: calculating a distance between the current position and the initial position of the preset part during the movement of the preset part, and displaying the menu panel in the initial state in response to the distance being detected to be reduced.

The initial position is a position of the preset part in response to it being determined that the hand of the user presents the menu-triggering gesture and the posture of the head relative to the hand meets the preset triggering condition.

Exemplarily, when determining that the user has the intent to trigger the panel, the position of the fingertip of the user may be recorded as the initial position, and the current position of the fingertip may be monitored in real time during the hand movement of the user, and the distance between the current position and the initial position can be calculated. When the fingertip of the user draws a closed shape in the air, the distance generally increases, and then decreases after reaching a critical point, and the menu panel in the initial state can start to be displayed at the critical point.

Step 1202: During the movement, according to the progress of movement, display the menu panel that changes from the initial state to the final state.

The closer the movement progress is to the preset condition, the closer the displayed menu panel is to the final state.

Optionally, displaying the menu panel that changes from the initial state to the final state based on the progress of movement may include: based on the distance between the current position and the initial position of the preset part, determining attribute information that matches the distance, and displaying the corresponding menu panel according to the attribute information, and until the distance is less than or equal to a distance threshold, displaying the menu panel in the final state.

The attribute information is negatively correlated with the distance. That is, under the case that other conditions are the same, the larger the distance, the smaller the attribute information, and the smaller the distance, the larger the attribute information. Optionally, a function may be used to calculate the current attribute information based on the distance. For example, the two can be linear or inversely proportional, or the like, or the attribute information corresponding to the current distance may be determined by looking up a table and the like, which is not limited here.

In this way, a menu panel of the corresponding state may be displayed according to the distance between the current position and the initial position of the preset part, which effectively simplifies the calculation and improves the processing efficiency.

In an actual application, after reaching the critical point and displaying the menu panel in the initial state, the movement of the fingertip of the user is continued to be detected. The decreasing distance between the current position and the initial position of the fingertip means that it approaches the preset condition, that is, approaches the normal display of the menu panel, and the visual feedback provided to the user at this time may be the adjustments of the menu panel in size from small to large, as well as in the opacity.

Among other optional implementations, the menu panel may also be displayed before the critical point. In addition, during the hand movement, in addition to the distance between the fingertip and the initial position, other information, such as the length of the movement trajectory, the direction of the current position relative to the initial position, and the like, may also be used to determine the current attribute information of the menu panel, as long as it can reflect the progress of the movement, which is not limited in the present embodiment.

Optionally, the size of the closed shape formed by the movement trajectory may also be determined when the menu panel is in the final state. The size of the closed shape is positively correlated with the size of the menu panel when it is in the final state, and the position of the menu panel in the final state is located inside the closed shape formed by the movement trajectory.

For example, if the closed shape is circular, then when the critical point is reached, the diameter of the circle can be determined, and the size of the menu panel in the final state can be determined according to the diameter of the circle. The larger the diameter, the larger the size of the menu panel in the final state. The smaller the diameter, the smaller the size of the menu panel in the final state. Also, the size (for example, the diameter or diagonal length) of the menu panel in the final state can be smaller than the diameter of the closed shape, and the final displayed menu panel can be located inside the circle.

The size of the menu panel is determined according to the shape of the closed loop drawn by the user, so that the user can determine the size of the menu panel to be evoked according to the current needs, and users with different visions can evoke the menu panel of different sizes, and the size of the menu panel can also be adjusted in different lighting conditions to meet the needs of different users or the same user in different scenarios.

In summary, the present embodiment can display a menu panel with changing size and opacity that reflect the current movement progress from multiple dimensions, enabling the user to understand the current action more accurately, and improving the reliability of visual feedback.

In one or more embodiments of the present disclosure, optionally, the user may also be provided with the function of canceling the display of the menu panel. The menu panel can be canceled at various times: during hand movement, and/or, after the menu panel is displayed normally.

Optionally, after determining that the user has the intent to trigger the menu, the user typically moves the hand as expected and keep the head looking at the hand. If the movement of the hand is detected to deviate from the expected trajectory during the hand movement of the user, or the head is no longer looking at the hand during the hand movement of the user, triggering of the menu panel may be canceled. If there is visual feedback during movement, the visual feedback may also be stopped.

Exemplarily, after displaying the menu panel in the initial state, in response to the detection of at least one of the following, display of the trailing or movement trajectory is stopped, and display of the gradient menu panel is stopped: the distance between the current position and the initial position of the preset part increases; the posture of the head relative to the hand of the user does not meet the triggering condition.

Taking the tap gesture as an example, after the critical point, the fingertip keeps approaching the initial position. If the fingertip is detected as moving away from the initial position during the movement, it means that the movement trajectory deviates from the expectation, and the user may not have the intention of evoking the menu panel, and the visual feedback can be canceled at this time. In addition, visual feedback can also be canceled if the user no longer looks at the hand and instead, moves the head to another direction or looks at another place during movement.

Optionally, after the menu panel is displayed normally, the user usually operates the menu panel with the hand and keeps the head looking at the hand during the process, so if the hand is detected as moving away from the menu panel or the head is detected as no longer looking at the hand, the menu panel may be closed.

Exemplarily, after displaying the menu panel in the final state, the menu panel is closed in response to the detection of at least one of the following: the distance between the preset part and the menu panel is greater than a distance threshold and the moving speed away from the menu panel is greater than a speed threshold; the posture of the head of the user relative to the hand does not meet the triggering condition.

Specifically, in the process that the user is operating the menu panel, the hand may temporarily leave the menu panel but the user has no intention to close it at this time. In this embodiment, when it is detected that the fingertip of the user is moving away from the panel quickly, it is determined that the current intention of the user is to close the panel, improving accuracy and reducing accidental closing.

Optionally, one of or both the fingertip detection and the head detection can be used. For example, the display of the menu panel is canceled only when both the fingertip and head meet the corresponding requirements. Alternatively, as long as the fingertip meets the appropriate requirements, the display of the menu panel may be canceled.

Through the scheme above, the user may be provided with a supporting operation of cancellation of the menu panel, which conforms to the instinctive intuition of the user and does not require the user to additionally memorize the special closing gesture, making it highly accurate and reducing the probability of misoperation.

Figure 13:
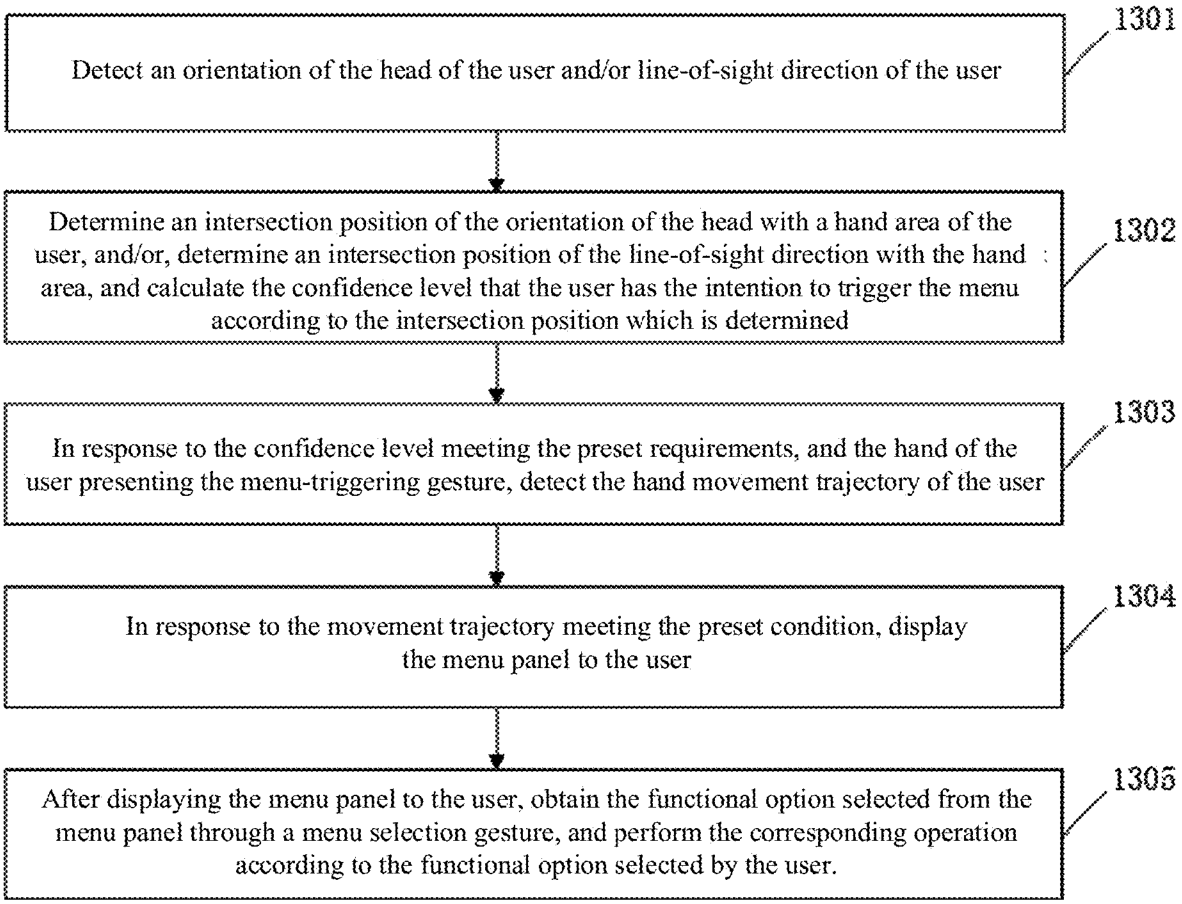
FIG. 13 is a flow chart of another method for triggering a menu provided in an embodiment of the present disclosure.

FIG. 13 is a flow chart of another method for triggering a menu provided in an embodiment of the present disclosure. As shown in FIG. 13, the method includes:

Step 1301: detecting an orientation of the head of the user and/or line-of-sight direction of the user.

Optionally, this step may be applied to a wearable display device, which is provided with a sensing device for collecting the head information of the user. The head information may be the head data and/or eye movement data above, and according to the head information, the orientation of the head of the user or the line-of-sight direction of the user may be determined.

In an optional embodiment, the head information collected by the sensing device may include the orientation of the head of the user and/or the line-of-sight direction of the user, so that the orientation of the head of the user and/or the line-of-sight direction of the user may be directly obtained according to the information collected by the sensing device.

In another optional embodiment, the head information collected by the sensing device may include other information, for example, the position of the eyes and/or pupils that may be used to determine the line-of-sight direction. Alternatively, the head information may include the angular velocity of the wearable display device that, together with the initial attitude of the head, may be used to determine the current orientation of the head.

Step 1302: Determine an intersection position of the orientation of the head with a hand area of the user, and/or, determine an intersection position of the line-of-sight direction with the hand area, and calculate the confidence level that the user has the intention to trigger the menu according to the intersection position which is determined.

The hand area is the area formed with a preset part of the hand as the center. The distance between the intersection position and the preset part is negatively correlated with the corresponding confidence level.

Optionally, a hand image can be taken through a shooting device arranged in the wearable display device, and according to the hand image, the hand area can be determined, where the hand area may be centered on a key position of the hand (a preset part). For example, when the hand is in a tap gesture, the preset part may be a fingertip, and with the fingertip as the center and the preset length as the radius, the hand area is formed on a plane perpendicular to the orientation of the head/line-of-sight direction.

If the orientation of the head/line-of-sight direction does not intersect with the hand region, then the confidence level is 0. If the intersection position of the orientation of the head/line-of-sight direction and the hand region is exactly at the position where the preset part is located, then the confidence level is 1. If the intersection position is not at the position of the preset part, the confidence level can be determined according to the distance between the intersection position and the preset part, where the closer the distance, the higher the confidence level, and the farther the distance, the lower the confidence level.

Step 1303: In response to the confidence level meeting the preset requirements, and the hand of the user presenting the menu-triggering gesture, detect the hand movement trajectory of the user.

Optionally, the preset requirement may include: the confidence level greater than a preset confidence threshold, such as 0.8. If the confidence level meets the preset requirement, the posture of the head relative to the hand can be considered to meet the preset triggering condition.

In an actual application, one of the orientation of the head or line-of-sight direction may be selected to calculate the confidence level, and the confidence level is compared with the threshold. Alternatively, the confidence level may be calculated separately by the orientation of the head and line-of-sight direction respectively, and the corresponding confidence levels are weighted and summed to obtain the combined confidence level, which is then compared with the threshold.

Through the preceding steps 1301 to 1303, hand movement trajectory of the user may be detected in response to the menu-triggering gesture presented by the hand of the user and the posture of the head relative to the hand meeting the preset triggering condition. Determining the confidence level according to the intersection of the orientation of the head/line-of-sight direction and the hand can improve the detection accuracy, making it highly adaptable in practical applications.

Step 1304: In response to the movement trajectory meeting the preset condition, display the menu panel to the user.

The specific implementation principle and process of this step may be described in the preceding embodiment, which is not described again here.

Step 1305: After displaying the menu panel to the user, obtain the functional option selected from the menu panel through a menu selection gesture, and perform the corresponding operation according to the functional option selected by the user.

The menu panel is used to provide at least one functional option. Exemplarily, the functional option may include: screenshotting, calibration, display settings, and so on, and the user may be allowed to add or hide the functional option.

The menu-triggering gesture is the same as the menu selection gesture. After the menu panel is presented to the user, the user can select a functional option from the menu panel while maintaining the same gesture, and the device can perform a corresponding operation according to the functional option selected by the user.

Optionally, the device may or may not provide visual feedback during the hand movement of the user. If visual feedback is provided, the phrase “after displaying the menu panel to the user” in this step may refer to after displaying the menu panel in the final state to the user.

In this embodiment, the gesture for triggering the menu is consistent with the gesture for operating the menu finally, for example, both are tap gestures. This enables the user to only need to use one gesture from the beginning of triggering to the final operation of the menu, without the need for the user to remember additional gestures, further reducing the burden on the user.

Figure 14:
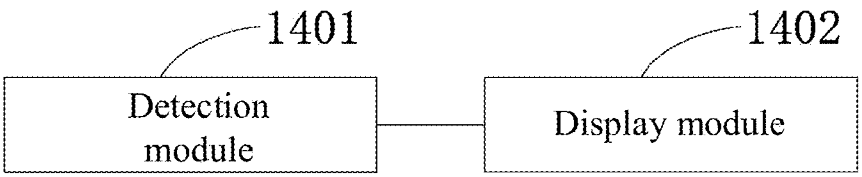
FIG. 14 is a structural block diagram of an apparatus for triggering a menu provided in an embodiment of the present disclosure.

Corresponding to the menu triggering method provided in the embodiment above, the embodiments of the present disclosure also provide an apparatus for triggering a menu. FIG. 14 is a structural block diagram of an apparatus for triggering a menu provided in an embodiment of the present disclosure. For illustrative purposes, only those parts relevant to the embodiments of the present disclosure are shown. Referring to FIG. 14, the apparatus includes: a detection module 1401 configured to, in response to a menu-triggering gesture presented by a hand of a user, and a posture of a head relative to the hand of the user that meets a preset triggering condition, detect a movement trajectory of the hand of the user; and a display module 1402 configured to, in response to the movement trajectory meeting a preset condition, display a menu panel to the user.

In one or more embodiments of the present disclosure, optionally, the display module 1402 is specifically configured to: in response to the hand of the user moving under the menu-triggering gesture and the movement trajectory meeting the preset condition, display the menu panel to the user.

In one or more embodiments of the present disclosure, optionally, the preset condition includes any one of the following: the movement trajectory is a random closed shape; the movement trajectory is a specific closed shape; and the movement trajectory is a closed shape, and the dimension of the closed shape is within a preset size range.

In one or more embodiments of the present disclosure, optionally, the display module 1402 is specifically configured to: in response to a movement of the hand of the user, provide corresponding visual feedback based on the progress of the movement until the movement meets the preset condition, display the menu panel to the user.

In one or more embodiments of the present disclosure, optionally, when the display module 1402 provides corresponding visual feedback based on the progress of movement in response to the movement of the hand of the user, the display module is specifically configured to: in response to the movement of the hand of the user, display a trailing or movement trajectory corresponding to a preset part of the hand of the user, and display a gradient menu panel based on the progress of movement until the preset condition is met, display the menu panel in the final state.

In one or more embodiments of the present disclosure, optionally, when display module 1402 displays the gradient menu panel based on the progress of movement, the display module is specifically configured to: in response to the progress of movement meeting a progress condition, display the menu panel in the initial state, where the attribute information of the menu panel in the initial state is different from that in the final state; where the attribute information includes: size and/or opacity; and during the movement, according to the progress of movement, display the menu panel that changes from the initial state to the final state.

In one or more embodiments of the present disclosure, optionally, when the display module 1402 displays the menu panel in the initial state, the display module is specifically configured to: calculate a distance between the current position of the preset part and the initial position during the movement of the preset part, and display the menu panel in the initial state in response to the distance being detected to be reduced; where according to the progress of movement, displaying the menu panel that changes from the initial state to the final state includes: based on the distance between the current position and the initial position of the preset part, determining attribute information that matches the distance, and displaying the corresponding menu panel according to the attribute information until the distance is less than or equal to a distance threshold, displaying the menu panel in the final state; where the initial position is the position of the preset part when it is determined that the hand of the user presents the menu-triggering gesture and the posture of the head relative to the hand meets the preset triggering condition; and the attribute information is negatively related to the distance.

In one or more embodiments of the present disclosure, optionally, the display module 1402 is further configured to: after the menu panel in the initial state is displayed, in response to the detection of at least one of the following, stop display of the trailing or movement trajectory, and stop display of the gradient menu panel: the distance between the current position of the preset part and the initial position increases; and the posture of the head of the user relative to the hand does not meet the triggering condition; and/or, after the menu panel in the final state is displayed, close the menu panel in response to the detection of at least one of the following: a distance between the preset part and the menu panel is greater than the distance threshold and a moving speed away from the menu panel is greater than a speed threshold; where the posture of the head of the user relative to the hand does not meet the triggering condition.

In one or more embodiments of the present disclosure, optionally, the display module 1402 is further configured to: determine the size of the menu panel in the final state according to the size of the closed shape formed by the moving trajectory; where the size of the closed shape is positively correlated with the size of the menu panel in the final state, and the position of the menu panel in the final state is located inside the closed shape formed by the movement trajectory.

In one or more embodiments of the present disclosure, optionally, the detection module 1401 is specifically configured to: detect orientation of the head of the user and/or line-of-sight direction of the user; determine an intersection position of the orientation of the head with a hand area of the user, and/or, determine an intersection position of the line-of-sight direction with the hand area, and calculate a confidence level that the user has the intention to trigger the menu according to the intersection position which is determined; in response to the confidence level meeting a preset requirement and the hand of the user presenting a menu-triggering gesture, detect the movement trajectory of the hand of the user; where the hand area is the area formed with the preset part of the hand as the center, and a distance between the intersection position and the preset part is negatively correlated with the corresponding confidence level.

In one or more embodiments of the present disclosure, optionally, the menu panel is configured to provide at least one functional option; the display module 1402 is further configured to: after the menu panel is displayed to the user, obtain a functional option selected from the menu panel through a menu selection gesture by the user, and perform the corresponding operation according to the functional option selected by the user; where the menu-triggering gesture is the same as the menu selection gesture.

The device provided in this embodiment can be used to implement the technical solution of the above method embodiments, with the same implementation principle and technical effect, which are not described again in this embodiment.

Figure 15:
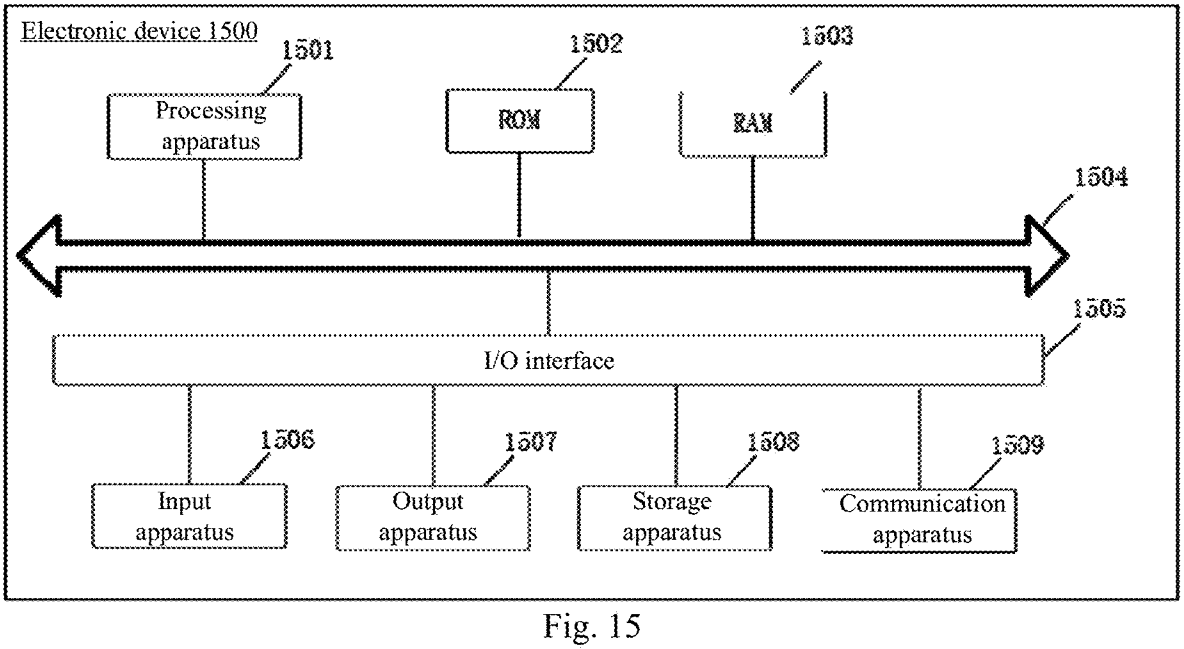
FIG. 15 is a structural schematic diagram of an electronic device provided in an embodiment of the present disclosure.

FIG. 15 is a structural schematic diagram of an electronic device provided in an embodiment of the present disclosure. Referring to FIG. 15, an electronic device 1500 may be a terminal device or a server. The terminal device may include, but is not limited to, a mobile phone, a laptop, a digital radio receiver, a personal digital assistant (PDA), a portable Android device (PAD), a portable media player (PMP), mobile terminals such as a vehicle terminal (for example, a vehicle navigation terminal) and a fixed terminal such as a digital TV, a desktop computer, and the like. The electronic device 500 shown in FIG. 15 is only an example and does not impose any restrictions on the functionality and scope of use of the embodiments of the present disclosure.

As shown in FIG. 15, the electronic device 1500 may include a processing apparatus 1501 (for example, a central processing unit, a graphics processing unit, and the like) that can perform various appropriate actions and processes according to a program stored in a read-only memory (ROM) 1502 or loaded from a storage apparatus 1508 into a random access memory (RAM) 1503. In the RAM 1503, various programs and data necessary for the operation of the electronic device 1500 are also stored. The processing apparatus 1501, the ROM 1502 and the RAM 1503 are connected to each other through a bus 1504. An input/output (I/O) interface 1505 is also connected to the bus 1504.

In general, the following apparatus may be connected to the I/O interface 1505: an input apparatus 1506 including, for example, a touch screen, a touchpad, a keyboard, a mouse, a camera, a microphone, an accelerometer, a gyroscope, and the like; an output apparatus 1507 including, for example, a liquid crystal display (LCD), a loudspeaker, a vibrator, or the like; a storage apparatus 1508 including, for example, a tape, a hard disk, or the like; and a communication apparatus 1509. The communication apparatus 1509 may allow the electronic device 1500 to communicate wirelessly or wired communication with other devices for exchange of data. Although FIG. 15 shows an electronic device 1500 with various apparatuses, it should be understood that it is not required to implement or have all of the apparatuses shown. It is possible to implement alternatively or to have more or fewer installations.

Particularly, according to the embodiments of the present disclosure, the processes described in the above reference flowchart may be implemented as a computer software program. For example, an embodiment of the present disclosure includes a computer program product including a computer program carried on a computer-readable medium that includes a program code for executing a method shown in a flowchart. In such an embodiment, the computer program may be downloaded and installed from a network through a communication apparatus 1509, or installed from a storage apparatus 1508, or from a ROM 1502. When the computer program is executed by the processing apparatus 1501, the features specified in the method of the embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage apparatus, a magnetic storage apparatus, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is enabled to perform the methods shown in the above-mentioned embodiments.

The computer program codes for performing the operations of the present disclosure may be written in one or more programming languages or a combination thereof. The above-mentioned programming languages include object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage apparatus, magnetic storage apparatus, or any suitable combination of the foregoing.

The first aspect, according to one or more embodiments of the present disclosure, a method for triggering a menu is provided. The method includes in response to a menu-triggering gesture presented by a hand of a user, and a posture of a head relative to the hand of the user that meets a preset triggering condition, detecting a movement trajectory of the hand of the user; in response to the movement trajectory meeting a preset condition, displaying a menu panel to the user.

In one or more embodiments of the present disclosure, optionally, in response to the movement trajectory meeting the preset condition, displaying the menu panel to the user includes: in response to the hand of the user moving under the menu-triggering gesture and the movement trajectory meeting the preset condition, displaying the menu panel to the user.

In one or more embodiments of the present disclosure, optionally, the preset condition includes any one of the following: the movement trajectory is a random closed shape; the movement trajectory is a specific closed shape; and the movement trajectory is a closed shape, and a dimension of the closed shape is within a preset size range.

In one or more embodiments of the present disclosure, optionally, in response to the movement trajectory meeting the preset condition, displaying the menu panel to the user includes: in response to a movement of the hand of the user, providing corresponding visual feedback based on progress of the movement until the preset condition is met, displaying the menu panel to the user.

In one or more embodiments of the present disclosure, optionally, in response to the movement of the hand of the user, providing corresponding visual feedback based on the progress of the movement includes: in response to the movement of the hand of the user, displaying a trailing or a movement trajectory corresponding to a preset part of the hand of the user, and displaying a gradient menu panel based on the progress of the movement until the preset condition is met, displaying the menu panel in the final state.

In one or more embodiments of the present disclosure, optionally, displaying the gradient menu panel based on the progress of the movement includes: in response to the progress of movement meeting a progress condition, displaying the menu panel in an initial state, where attribute information of the menu panel in the initial state is different from that in the final state; the attribute information includes: size and/or opacity; and during the movement, according to the progress of the movement, displaying the menu panel that changes from the initial state to the final state.

In one or more embodiments of the present disclosure, optionally, displaying the menu panel in the initial state in response to the progress of the movement meeting the progress condition includes: calculating a distance between a current position and an initial position of the preset part during the movement of the preset part, and displaying the menu panel in the initial state in response to the distance being detected to be reduced; where displaying the menu panel that changes from the initial state to the final state according to the progress of movement includes: based on the distance between the current position and the initial position of the preset part, determining attribute information that matches the distance, and displaying the corresponding menu panel according to the attribute information until the distance is less than or equal to a distance threshold, displaying the menu panel in the final state; where the initial position is a position of the preset part in response to it being determined that the hand of the user presents the menu-triggering gesture and the posture of the head relative to the hand meets the preset triggering condition; and the attribute information is negatively correlated to the distance.

In one or more embodiments of the present disclosure, optionally, the method further includes: after the menu panel in the initial state is displayed, in response to detection of at least one of the following, stopping display of the trailing or the movement trajectory, and stopping display of the gradient menu panel: the distance between the current position and the initial position of the preset part increases; and the posture of the head of the user relative to the hand of the user does not meet the preset triggering condition; and/or, after the menu panel in the final state is displayed, closing the menu panel in response to the detection of at least one of the following: a distance between the preset part and the menu panel is greater than the distance threshold and a moving speed away from the menu panel is greater than a speed threshold; the posture of the head of the user relative to the hand does not meet the preset triggering condition.

In one or more embodiments of the present disclosure, optionally, the method further includes: determining a size of the menu panel in the final state according to a size of a closed shape formed by the moving trajectory; where the size of the closed shape is positively correlated with the size of the menu panel in the final state, and a position of the menu panel in the final state is located inside the closed shape formed by the movement trajectory.

In one or more embodiments of the present disclosure, optionally, in response to the menu-triggering gesture presented by the hand of the user, and the posture of the head relative to the hand of the user that meets the preset triggering condition, detecting the movement trajectory of the hand of the user includes: detecting an orientation of the head of the user and/or a line-of-sight direction of the user; determining an intersection position of the orientation of the head with a hand area of the user, and/or, determining an intersection position of the line-of-sight direction with the hand area, and calculating a confidence level that the user has an intention to trigger the menu according to the intersection position which is determined; in response to the confidence level meeting a preset requirement and the hand of the user presenting the menu-triggering gesture, detecting the movement trajectory of the hand of the user; where the hand area is an area formed with the preset part of the hand as a center, and a distance between the intersection position and the preset part is negatively correlated with the corresponding confidence level.

In one or more embodiments of the present disclosure, optionally, the menu panel is configured to provide at least one functional option; and the method further includes: after the menu panel is displayed to the user, obtaining a functional option selected from the menu panel through a menu selection gesture by the user, and performing the corresponding operation according to the functional option selected by the user; and where the menu-triggering gesture is the same as the menu selection gesture.

The second aspect, according to one or more embodiments of the present disclosure, an apparatus for triggering a menu is provided. The apparatus includes: a detection module configured to, in response to a menu-triggering gesture presented by a hand of a user, and a posture of a head relative to the hand of the user that meets a preset triggering condition, detect a movement trajectory of the hand of the user; and a display module configured to, in response to the movement trajectory meeting a preset condition, display a menu panel to the user.

In one or more embodiments of the present disclosure, optionally, the display module is specifically configured to: in response to the hand of the user moving under the menu-triggering gesture and the movement trajectory meeting the preset condition, display the menu panel to the user.

In one or more embodiments of the present disclosure, optionally, the preset condition includes any one of the following: the movement trajectory is a random closed shape; the movement trajectory is a specific closed shape; and the movement trajectory is a closed shape, and the dimension of the closed shape is within a preset size range.

In one or more embodiments of the present disclosure, optionally, the display module is specifically configured to: in response to a movement of the hand of the user, provide corresponding visual feedback based on the progress of the movement until the movement meets the preset condition, display the menu panel to the user.

In one or more embodiments of the present disclosure, optionally, when the display module provides corresponding visual feedback based on the progress of movement in response to the movement of the hand of the user, the display module is specifically configured to: in response to the movement of the hand of the user, display a trailing or movement trajectory corresponding to a preset part of the hand of the user, and display a gradient menu panel based on the progress of movement until the preset condition is met, display the menu panel in the final state.

In one or more embodiments of the present disclosure, optionally, when display module displays the gradient menu panel based on the progress of movement, the display module is specifically configured to: in response to the progress of movement meeting a progress condition, display the menu panel in the initial state, where the attribute information of the menu panel in the initial state is different from that in the final state; where the attribute information includes: size and/or opacity; and during the movement, according to the progress of movement, display the menu panel that changes from the initial state to the final state.

In one or more embodiments of the present disclosure, optionally, when the display module displays the menu panel in the initial state, the display module is specifically configured to: calculate a distance between the current position of the preset part and the initial position during the movement of the preset part, and display the menu panel in the initial state in response to the distance being detected to be reduced; where according to the progress of movement, displaying the menu panel that changes from the initial state to the final state includes: based on the distance between the current position and the initial position of the preset part, determining attribute information that matches the distance, and displaying the corresponding menu panel according to the attribute information until the distance is less than or equal to a distance threshold, displaying the menu panel in the final state; where the initial position is the position of the preset part when it is determined that the hand of the user presents the menu-triggering gesture and the posture of the head relative to the hand meets the preset triggering condition; and the attribute information is negatively related to the distance.

In one or more embodiments of the present disclosure, optionally, the display module is further configured to: after the menu panel in the initial state is displayed, in response to the detection of at least one of the following, stop display of the trailing or movement trajectory, and stop display of the gradient menu panel: the distance between the current position of the preset part and the initial position increases; and the posture of the head of the user relative to the hand does not meet the triggering condition; and/or, after the menu panel in the final state is displayed, close the menu panel in response to the detection of at least one of the following: a distance between the preset part and the menu panel is greater than the distance threshold and a moving speed away from the menu panel is greater than a speed threshold; where the posture of the head of the user relative to the hand does not meet the triggering condition.

In one or more embodiments of the present disclosure, optionally, the display module is further configured to: determine the size of the menu panel in the final state according to the size of the closed shape formed by the moving trajectory; where the size of the closed shape is positively correlated with the size of the menu panel in the final state, and the position of the menu panel in the final state is located inside the closed shape formed by the movement trajectory.

In one or more embodiments of the present disclosure, optionally, the detection module is specifically configured to: detect orientation of the head of the user and/or line-of-sight direction of the user; determine an intersection position of the orientation of the head with a hand area of the user, and/or, determine an intersection position of the line-of-sight direction with the hand area, and calculate a confidence level that the user has the intention to trigger the menu according to the intersection position which is determined; in response to the confidence level meeting a preset requirement and the hand of the user presenting a menu-triggering gesture, detect the movement trajectory of the hand of the user; where the hand area is the area formed with the preset part of the hand as the center, and a distance between the intersection position and the preset part is negatively correlated with the corresponding confidence level.

In one or more embodiments of the present disclosure, optionally, the menu panel is configured to provide at least one functional option; the display module is further configured to: after the menu panel is displayed to the user, obtain a functional option selected from the menu panel through a menu selection gesture by the user, and perform the corresponding operation according to the functional option selected by the user; where the menu-triggering gesture is the same as the menu selection gesture.

The third aspect, according to one or more embodiments of the present disclosure, an electronic device is provided. The electronic device includes a storage and at least one processor; the storage stores a computed-executed instruction; and the at least one processor executes the computed-executed instruction stored in the storage, so that the at least one processor implements any method for triggering the menu according to the first aspect.

The fourth aspect, according to one or more embodiments of the present disclosure, a computer-readable storage medium is provided. A computer execution instruction is stored in the computer-readable storage medium. The computer-executed instruction, when being executed by a processor, implements any method for triggering the menu according to the first aspect.

The fifth aspect, according to one or more embodiments of the present disclosure, a computer program product is provided. The computer program product includes a computer program that, when being executed by a processor, implements any method for triggering the menu according to the first aspect.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A method for triggering a menu, comprising:

in response to the movement trajectory of the hand of the user which is detected and meeting a preset condition, displaying a menu panel to the user, wherein in response to the movement trajectory meeting the preset condition, displaying the menu panel to the user comprises:

in response to a movement of the hand of the user, providing corresponding visual feedback based on progress of the movement, until the preset condition is met, displaying the menu panel to the user, wherein providing corresponding visual feedback based on progress of the movement comprises:

in response to the progress of movement meeting a progress condition, displaying the menu panel in an initial state, wherein attribute information of the menu panel in the initial state is different from that in the final state; the attribute information comprises: size and/or opacity.

2. The method according to claim 1, wherein in response to the movement trajectory meeting the preset condition, displaying the menu panel to the user comprises:

in response to the hand of the user moving on a basis of maintaining the menu-triggering gesture and the movement trajectory meeting the preset condition, displaying the menu panel to the user.

3. The method according to claim 1, wherein the preset condition comprises any one of the following:

the movement trajectory is a random closed shape;

the movement trajectory is a specific closed shape; and the movement trajectory is a closed shape, and a dimension of the closed shape is within a preset size range.

4. The method according to claim 1, wherein in response to the movement of the hand of the user, providing corresponding visual feedback based on the progress of the movement comprises:

in response to the movement of the hand of the user, displaying a trailing or a movement trajectory corresponding to a preset part of the hand of the user, and displaying a gradient menu panel based on the progress of the movement until the preset condition is met, displaying the menu panel in the final state.

5. The method according to claim 4, wherein displaying the gradient menu panel based on the progress of the movement comprises:

during the movement, according to the progress of the movement, displaying the menu panel that changes from the initial state to the final state.

6. The method according to claim 5, wherein displaying the menu panel in the initial state in response to the progress of the movement meeting the progress condition comprises:

calculating a distance between a current position and an initial position of the preset part during the movement of the preset part, and displaying the menu panel in the initial state in response to the distance being detected to be reduced;

wherein displaying the menu panel that changes from the initial state to the final state according to the progress of movement comprises:

based on the distance between the current position and the initial position of the preset part, determining attribute information that matches the distance, and displaying the corresponding menu panel according to the attribute information until the distance is less than or equal to a distance threshold, displaying the menu panel in the final state;

wherein the initial position is a position of the preset part in response to it being determined that the hand of the user presents the menu-triggering gesture and the posture of the head relative to the hand meets the preset triggering condition; and the attribute information is negatively correlated to the distance.

7. The method according to claim 5, further comprising:

after the menu panel in the initial state is displayed, in response to detection of at least one of the following, stopping display of the trailing or the movement trajectory, and stopping display of the gradient menu panel: the distance between the current position and the initial position of the preset part increases; and the posture of the head of the user relative to the hand of the user does not meet the preset triggering condition.

8. The method according to claim 6, further comprising:

after the menu panel in the final state is displayed, closing the menu panel in response to the detection of at least one of the following: a distance between the preset part and the menu panel is greater than the distance threshold and a moving speed away from the menu panel is greater than a speed threshold; the posture of the head of the user relative to the hand does not meet the preset triggering condition.

9. The method according to claim 5, further comprising:

determining a size of the menu panel in the final state according to a size of a closed shape formed by the moving trajectory;

wherein the size of the closed shape is positively correlated with the size of the menu panel in the final state, and a position of the menu panel in the final state is located inside the closed shape formed by the movement trajectory.

10. The method according to claim 1, wherein in response to the menu-triggering gesture presented by the hand of the user, and the posture of the head relative to the hand of the user that meets the preset triggering condition, detecting the movement trajectory of the hand of the user comprises:

detecting an orientation of the head of the user;

determining an intersection position of the orientation of the head with a hand area of the user, and calculating a confidence level that the user has an intention to trigger the menu according to the intersection position which is determined;

in response to the confidence level meeting a preset requirement and the hand of the user presenting the menu-triggering gesture, detecting the movement trajectory of the hand of the user;

wherein the hand area is an area formed with the preset part of the hand as a center, and a distance between the intersection position and the preset part is negatively correlated with the corresponding confidence level.

11. The method according to claim 1, wherein in response to the menu-triggering gesture presented by the hand of the user, and the posture of the head relative to the hand of the user that meets the preset triggering condition, detecting the movement trajectory of the hand of the user comprises:

detecting a line-of-sight direction of the user;

determining an intersection position of the line-of-sight direction with a hand area, and calculating a confidence level that the user has an intention to trigger the menu according to the intersection position which is determined;

in response to the confidence level meeting a preset requirement and the hand of the user presenting the menu-triggering gesture, detecting the movement trajectory of the hand of the user;

wherein the hand area is an area formed with the preset part of the hand as a center, and a distance between the intersection position and the preset part is negatively correlated with the corresponding confidence level.

12. The method according to claim 1, wherein in response to the menu-triggering gesture presented by the hand of the user, and the posture of the head relative to the hand of the user that meets the preset triggering condition, detecting the movement trajectory of the hand of the user comprises:

detecting an orientation of the head of the user and a line-of-sight direction of the user;

determining an intersection position of the orientation of the head with a hand area of the user, and determining an intersection position of the line-of-sight direction with the hand area, and calculating a confidence level that the user has an intention to trigger the menu according to the intersection position which is determined;

in response to the confidence level meeting a preset requirement and the hand of the user presenting the menu-triggering gesture, detecting the movement trajectory of the hand of the user;

wherein the hand area is an area formed with the preset part of the hand as a center, and a distance between the intersection position and the preset part is negatively correlated with the corresponding confidence level.

13. The method according to claim 1, wherein the menu panel is configured to provide at least one functional option; and the method further comprises:

after the menu panel is displayed to the user, obtaining a functional option selected from the menu panel through a menu selection gesture by the user, and performing the corresponding operation according to the functional option selected by the user; and wherein the menu-triggering gesture is the same as the menu selection gesture.

14. The method according to claim 2, wherein the preset condition comprises any one of the following:

the movement trajectory is a random closed shape;

the movement trajectory is a specific closed shape; and the movement trajectory is a closed shape, and a dimension of the closed shape is within a preset size range.

15. The method according to claim 6, further comprising:

after the menu panel in the initial state is displayed, in response to detection of at least one of the following, stopping display of the trailing or the movement trajectory, and stopping display of the gradient menu panel: the distance between the current position and the initial position of the preset part increases; and the posture of the head of the user relative to the hand of the user does not meet the preset triggering condition.

16. The method according to claim 2, wherein the menu panel is configured to provide at least one functional option; and the method further comprises:

after the menu panel is displayed to the user, obtaining a functional option selected from the menu panel through a menu selection gesture by the user, and performing the corresponding operation according to the functional option selected by the user; and wherein the menu-triggering gesture is the same as the menu selection gesture.

17. The method according to claim 1, wherein in response to a menu-triggering gesture presented by a hand of a user, and a posture of a head relative to the hand of the user that meets a preset triggering condition, the movement trajectory of the hand of the user is detected.

18. An electronic device, comprising: a storage and at least one processor;

wherein the storage stores a computed-executed instruction; and the at least one processor executes the computed-executed instruction stored in the storage, so that the at least one processor implements a method for triggering the menu, the method comprises:

in response to the movement trajectory of the hand of the user which is detected and meeting a preset condition which is detected, displaying a menu panel to the user, wherein in response to the movement trajectory meeting the preset condition, displaying the menu panel to the user comprises:

in response to a movement of the hand of the user, providing corresponding visual feedback based on progress of the movement, until the preset condition is met, displaying the menu panel to the user, wherein providing corresponding visual feedback based on progress of the movement comprises:

in response to the progress of movement meeting a progress condition, displaying the menu panel in an initial state, wherein attribute information of the menu panel in the initial state is different from that in the final state; the attribute information comprises: size and/or opacity.

19. A non-transitory computer-readable storage medium with a computer-executed instruction stored thereon, wherein the computer-executed instruction, when being executed by a processor, implements a method for triggering the menu, the method comprises:

in response to the movement trajectory of the hand of the user which is detected and meeting a preset condition, displaying a menu panel to the user, wherein in response to the movement trajectory meeting the preset condition, displaying the menu panel to the user comprises:

in response to a movement of the hand of the user, providing corresponding visual feedback based on progress of the movement, until the preset condition is met, displaying the menu panel to the user, wherein providing corresponding visual feedback based on progress of the movement comprises:

in response to the progress of movement meeting a progress condition, displaying the menu panel in an initial state, wherein attribute information of the menu panel in the initial state is different from that in the final state; the attribute information comprises: size and/or opacity.

* * * * *